United States Patent
Jeon et al.

(10) Patent No.: US 10,503,674 B2
(45) Date of Patent: Dec. 10, 2019

(54) SEMICONDUCTOR DEVICE INCLUDING A CLOCK SOURCE FOR GENERATING A CLOCK SIGNAL AND A CLOCK CONTROL CIRCUIT FOR CONTROLLING THE CLOCK SOURCE IN HARDWARE, A SEMICONDUCTOR SYSTEM INCLUDING THE SEMICONDUCTOR DEVICE, AND A METHOD OF OPERATING THE SEMICONDUCTOR DEVICE

(71) Applicant: SAMSUNG ELECTRONICS CO., LTD., Suwon-si, Gyeonggi-Do (KR)

(72) Inventors: Ho Yeon Jeon, Hwaseong-si (KR); Ah Chan Kim, Hwaseong-si (KR); Jae Gon Lee, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 240 days.

(21) Appl. No.: 15/424,028

(22) Filed: Feb. 3, 2017

(65) Prior Publication Data
US 2017/0220495 A1    Aug. 3, 2017

Related U.S. Application Data

(60) Provisional application No. 62/290,540, filed on Feb. 3, 2016.

(30) Foreign Application Priority Data

Jan. 3, 2017    (KR) ........................ 10-2017-0000722

(51) Int. Cl.
G06F 13/16    (2006.01)
G06F 13/40    (2006.01)
G06F 13/42    (2006.01)

(52) U.S. Cl.
CPC ...... *G06F 13/1689* (2013.01); *G06F 13/4068* (2013.01); *G06F 13/42* (2013.01)

(58) Field of Classification Search
CPC ... G06F 13/1689; G06F 13/4068; G06F 13/42
See application file for complete search history.

(56) References Cited

U.S. PATENT DOCUMENTS

| 5,628,019 A | 5/1997 | O'Brien |
| 6,393,572 B1 | 5/2002 | Datta et al. |

(Continued)

FOREIGN PATENT DOCUMENTS

| JP | 2007-052685 | 3/2007 |
| JP | 2008-097594 | 4/2008 |

(Continued)

*Primary Examiner* — Eric T Oberly
(74) *Attorney, Agent, or Firm* — F. Chau & Associates, LLC

(57) ABSTRACT

A semiconductor device includes a first intellectual property block (IP block) which includes a function unit and an interface unit; a first clock control circuit which controls a first clock source; a second clock control circuit which transmits a first clock request to the first clock control circuit, and controls a second clock source which receives a clock signal from the first clock source; and a channel management circuit configured to transmit a second clock request to the second clock control circuit in response to a clock stop request received from the first IP block; wherein the function unit controls an operation of the first IP block, and the interface unit receives a first signal provided from a second IP block electrically connected to the first IP block and provides the first signal to the function unit.

20 Claims, 14 Drawing Sheets

(56) References Cited

U.S. PATENT DOCUMENTS

| | | | |
|---|---|---|---|
| 6,442,642 B1* | 8/2002 | Brooks | G06F 13/4018 |
| | | | 710/105 |
| 7,243,255 B2 | 7/2007 | Cox, Jr. et al. | |
| 9,047,415 B2 | 6/2015 | Priel et al. | |
| 9,152,213 B2 | 10/2015 | Yun et al. | |
| 2011/0145625 A1* | 6/2011 | Beattie | G06F 1/04 |
| | | | 713/600 |
| 2013/0173951 A1* | 7/2013 | Vogel | G06F 1/10 |
| | | | 713/600 |
| 2014/0266333 A1* | 9/2014 | Jouin | G06F 1/3237 |
| | | | 327/142 |
| 2015/0339257 A1* | 11/2015 | Hug | H04L 5/16 |
| | | | 710/110 |
| 2016/0094337 A1 | 3/2016 | Choi et al. | |

FOREIGN PATENT DOCUMENTS

| | | |
|---|---|---|
| JP | 2008-293230 | 12/2008 |
| JP | 4645840 | 12/2010 |
| JP | 5617795 | 9/2014 |

\* cited by examiner

1300

1400

SEMICONDUCTOR DEVICE INCLUDING A CLOCK SOURCE FOR GENERATING A CLOCK SIGNAL AND A CLOCK CONTROL CIRCUIT FOR CONTROLLING THE CLOCK SOURCE IN HARDWARE, A SEMICONDUCTOR SYSTEM INCLUDING THE SEMICONDUCTOR DEVICE, AND A METHOD OF OPERATING THE SEMICONDUCTOR DEVICE

CROSS-REFERENCE TO RELATED APPLICATIONS

This application claims priority to U.S. Provisional Patent Application No. 62/290,540 filed on Feb. 3, 2016 in the United States Patent and Trademark Office and Korean Patent Application No. 10-2017-0000722 filed on Jan. 3, 2017 in the Korean Intellectual Property Office, the disclosures of which are incorporated by reference herein in their entireties.

TECHNICAL FIELD

The present inventive concept relates to a semiconductor device, a semiconductor system, and a method for operating a semiconductor device.

DESCRIPTION OF THE RELATED ART

A system-on-chip (SoC) may include one or more intellectual property blocks (IP blocks), a clock management unit (CMU), and a power management unit (PMU). The CMU provides a clock signal to one or more IP blocks. The CMU may not provide the clock signal to an IP block that is not in operation, thereby reducing the waste of resources in a system that employs the SoC.

To control the provision of the clock signal, various clock sources included in the CMU, such as a multiplexing circuit (MUX circuit), a clock dividing circuit, a short stop circuit and a clock gating circuit, may be controlled by software using a special function register (SFR). However, the control speed of software may be slower than the control speed of hardware.

SUMMARY

According to an exemplary embodiment of the present inventive concept, there is provided a semiconductor device including a first intellectual property (IP) block which comprises a function unit and an interface unit; a first clock control circuit which controls a first clock source; a second clock control circuit which transmits a first clock request to the first clock control circuit, and controls a second clock source which receives a clock signal from the first clock source; and a channel management circuit configured to transmit a second clock request to the second clock control circuit in response to a clock stop request received from the first IP block; wherein the function unit controls an operation of the first IP block, and the interface unit receives a first signal provided from a second IP block electrically connected to the first IP block and provides the first signal to the function unit.

According to an exemplary embodiment of the present inventive concept, there is provided a semiconductor device including a master IP block which operates in response to a first clock signal provided from a clock management unit (CMU); and a slave IP block which comprises a function unit which operates in response to a second clock signal provided from the CMU, and an interface unit configured to receive a bus operation signal from the master IP block at a first time point and provide the bus operation signal to the function unit at a second time point different from the first time point.

According to an exemplary embodiment of the present inventive concept, there is provided a semiconductor system including a system-on-chip (SoC) comprising: a first IP block which comprises a function unit and an interface unit; a second IP block electrically connected to the first IP block; a first clock control circuit which controls a first clock source; a second clock control circuit which transmits a first clock request to the first clock control circuit, and controls a second clock source which receives a clock signal from the first clock source; and a channel management circuit which transmits a second clock request to the second clock control circuit in response to a clock stop request received from the first IP block, and one or more external devices electrically connected to the SoC, wherein the function unit controls an operation of the first IP block, and the interface unit receives a first signal provided from the second IP block and provides the first signal to the function unit.

According to an exemplary embodiment of the present inventive concept, there is provided a method for operating a semiconductor device including receiving a first signal from a master IP block; transmitting a clock request for waking up a function unit of a slave IP block to a CMU; generating a second signal corresponding to the first signal, after the slave IP block receives a clock signal from the CMU; and providing the second signal to the function unit.

According to an exemplary embodiment of the inventive concept, there is provided a semiconductor device including: a first IP block which includes a function unit and an interface unit; and a second IP block electrically connected to the first IP block, wherein the interface unit is configured to receive a first signal from the second IP block while the function unit is in a sleep state, and to provide a second signal corresponding to the first signal when the function unit wakes up.

BRIEF DESCRIPTION OF THE DRAWINGS

The above and other features of the present inventive concept will become more apparent by describing in detail exemplary embodiments thereof with reference to the attached drawings, in which.

DETAILED DESCRIPTION OF THE EMBODIMENTS

Figure 1:
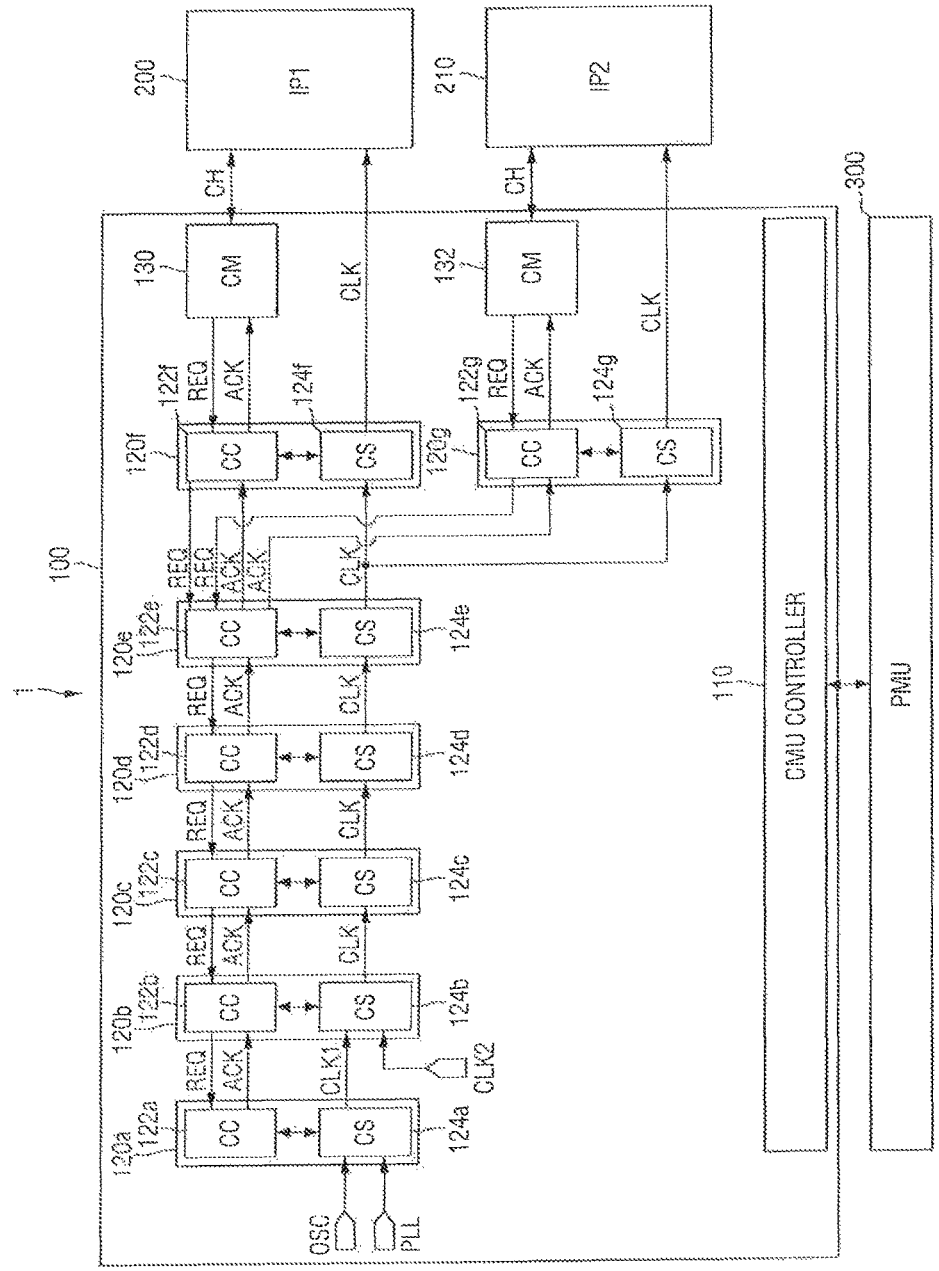
FIG. 1 is a schematic diagram of a semiconductor device according to an exemplary embodiment of the present inventive concept.

FIG. 1 is a schematic diagram of a semiconductor device according to an exemplary embodiment of the present inventive concept.

Referring to FIG. 1, a semiconductor device 1 according to an exemplary embodiment of the present inventive concept includes a clock management unit (CMU) 100, intellectual property blocks (IP blocks) 200 and 210, and a power management unit (PMU) 300. The semiconductor device 1 according to exemplary embodiments of the present inventive concept may be provided as a system-on-chip (SoC), but the present inventive concept is not limited thereto.

The CMU 100 provides a clock signal to the IP blocks 200 and 210. In this embodiment, the CMU 100 includes clock components 120a, 120b, 120c, 120d, 120e, 120f and 120g, channel management circuits 130 and 132, and a CMU controller 110. The clock components 120a, 120b, 120c, 120d, 120e, 120f and 120g generate a clock signal to be provided to the IP blocks 200 and 210, and the channel management circuits 130 and 132 are disposed between the clock components 120f and 120g and the IP blocks 200 and 210 to provide a communication channel CH between the CMU 100 and the IP blocks 200 and 210. Further, the CMU controller 110 provides the clock signals to the IP blocks 200 and 210, using the clock components 120a, 120b, 120c, 120d, 120e, 120f and 120g.

In exemplary embodiments of the present inventive concept, the communication channel CH provided by the channel management circuits 130 and 132 may be provided to conform to a Low Power Interface (LPI), a Q-channel interface or a P-channel interface as defined in the ARM® LPI Specification, but the present inventive concept is not limited thereto. For example, the communication channel CH may conform to an arbitrary communication protocol depending on how the semiconductor device 1 is to be implemented.

Each of the clock components 120a, 120b, 120c, 120d, 120e, 120f and 120g includes clock sources 124a, 124b, 124c, 124d, 124e, 124f and 124g, and clock control circuits 122a, 122b, 122c, 122d, 122e, 122f and 122g that control each of the clock sources 124a, 124b, 124c, 124d, 124e, 124f and 124g. The clock sources 124a, 124b, 124c, 124d, 124e, 124f and 124g, for example, may include a multiplexing circuit (MUX circuit), a clock dividing circuit, a short stop circuit, a clock gating circuit and the like.

The clock components 120a, 120b, 120c, 120d, 120e, 120f and 120g have a parent-child relationship with each other. In the present embodiment, the clock component 120a is a parent of the clock component 120b, and the clock component 120b is a child of the clock component 120a and a parent of the clock component 120c. In addition, the clock component 120e is a parent of the two clock components 120f and 120g, and the clock components 120f and 120g are children of the clock component 120e. Additionally, in the present embodiment, the clock component 120a disposed to be closest to a phase locked loop (PLL) is a root clock component, and the clock components 120f and 120g disposed to be closest to the IP blocks 200 and 210 are leaf clock components. Such a parent-child relationship is also formed among the clock control circuits 122a, 122b, 122c, 122d, 122e, 122f and 122g and among the clock sources 124a, 124b, 124c, 124d, 124e, 124f and 124g in correspondence with the parent-child relationship of the clock components 120a, 120b, 120c, 120d, 120e, 120f and 120g.

In an embodiment, the clock component 120a is implemented by a PLL controller. In an embodiment, the PLL controller receives from an oscillator OSC, a constant or variable frequency signal oscillated by the oscillator OSC and a PLL signal output by a PLL, and outputs one of the two received signals based on a certain condition. When the components need the PLL signal, the PLL controller outputs the PLL signal. When the components need the oscillator signal, the PLL controller outputs the oscillator signal. For example, the PLL controller can be implemented using a ring oscillator or a crystal oscillator. In an embodiment, the clock component 120b is a clock multiplexer unit that receives a first clock signal CLK1 from the first clock component 120a and a second clock signal CLK2 from an external source (e.g., an external CMU).

The clock control circuits 122a, 122b, 122c, 122d, 122e, 122f and 122g transmit and receive a clock request (REQ) and an acknowledgment (ACK) thereof between the parent and the child, and provide the clock signal to the IP blocks 200 and 210.

For example, if the IP block 200 does not require a clock signal, for example, if the IP block 200 is to be in a sleep state, the CMU 100 stops the provision of the clock signal to the IP block 200.

For example, the channel management circuit 130 transmits a first signal for stopping the provision of the clock signal to the IP block 200, under the control of the CMU 100 or the CMU controller 110. Upon receiving the first signal, the IP block 200 transmits a second signal, to indicate that the clock signal may be stopped, to the channel management circuit 130, after completion of a job being processed. After receiving the second signal from the IP block 200, the channel management circuit 130 requests the clock component 120f to instruct its parent to stop the provision of the clock signal.

As an example, if the communication channel CH provided by the channel management circuit 130 conforms to the Q-channel interface, the channel management circuit 130 transmits a QREQn signal having a first logic value (e.g., logic low, hereinafter, indicated by L) as the first signal to the IP block 200. Thereafter, the channel management circuit 130 receives, for example, a QACCEPTn signal having the first logic value as the second signal from the IP block 200. Then, the channel management circuit 130 transmits the clock request (REQ), for example, having the first logic value, to the clock component 120f. In this case, the clock request (REQ) having the first logic value refers to a "clock provision stop request".

Upon receiving the clock request (REQ) having the first logic value, in other words, the clock provision stop request, from the channel management circuit 130, the clock control circuit 122*f* instructs the clock source 124*f* (e.g., the clock gating circuit) to stop the provision of the clock signal. Therefore, the IP block 200 may enter the sleep mode. In this process, the clock control circuit 122*f* may provide an ACK having the first logic value to the channel management circuit 130. It should be noted that, even though the channel management circuit 130 receives the acknowledgment (ACK) having the first logic value after transmitting the clock provision stop request having the first logic value, the stoppage of the clock provision from the clock source 124*f* may not be ensured. This is so, because the above-mentioned acknowledgment (ACK) may only mean that the clock control circuit 122*f* recognizes that the clock component 120*f*, which is the parent of the channel management circuit 130, does not have to provide a clock to the channel management circuit 130.

On the other hand, the clock control circuit 122*f* of the clock component 120*f* may transmit a clock request (REQ) having the first logic value to the clock control circuit 122*e* of its parent clock component 120*e*. If the IP block 210 does not require a clock signal, for example, when the clock control circuit 122*e* receives a request for clock provision stop from the clock control circuit 122*g*, the clock control circuit 122*e* disables the clock source 124*e* (e.g., a clock dividing circuit) to stop the provision of the clock signal. As a result, the IP blocks 200 and 210 may enter the sleep mode.

Such an operation may be similarly performed on the other clock control circuits 122*a*, 122*b*, 122*c* and 122*d*.

Additionally, even though the clock control circuit 122*f* of the clock component 120*f* transmits the clock request (REQ) having the first logic value to the clock control circuit 122*e* of its parent clock component 120*e*, if the IP block 210 is in the running state, the clock control circuit 122*e* may not disable the clock source 124*e*. Thereafter, only when the IP block 210 no longer requires a clock signal, does the clock control circuit 122*e* disable the clock source 124*e* and transmit the clock request (REQ) having the first logic value to its parent clock control circuit 120*d*. In other words, the clock control circuit 122*e* may disable the clock source 124*e*, only when it receives a clock provision stop request from both of its children clock control circuits 122*f* and 122*g*.

The CMU 100 then resumes the provision of the clock signal to the IP blocks 200 and 210 when all of the clock sources 124*a*, 124*b*, 124*c*, 124*d*, 124*e* and 124*f* are disabled in the sleep state of the IP blocks 200 and 210 and the IP block 200 enters the running state.

The channel management circuit 130 transmits the clock request (REQ) having a second logic value (e.g., logic high, hereinafter indicated by H) to the clock control circuit 122*f* of its parent clock component 120*f*, and waits for the acknowledgment (ACK) from the clock control circuit 122*f*. Here, the clock request (REQ) having the second logic value refers to "clock provision request", and the acknowledgment (ACK) of the clock provision request means that the provision of the clock is resumed from the clock source 124*f*. The clock control circuit 122*f* may not immediately enable the clock source 124*f* (e.g., a clock gating circuit) and thus waits for the provision of the clock signal from its parent.

Next, the clock control circuit 122*f* transmits a clock request (REQ) having a second logic value, in other words, a clock provision request, to its parent clock control circuit 122*e*, and waits for the acknowledgment (ACK) from the clock control circuit 122*e*. Such an operation may be similarly performed on the clock control circuits 122*a*, 122*b*, 122*c* and 122*d*.

The clock control circuit 122*a*, which is a root clock component having received the clock request (REQ) having the second logic value from the clock control circuit 122*b*, enables the clock source 124*a* (e.g., a multiplexing circuit), and transmits the acknowledgment (ACK) to the clock control circuit 122*b*. When the clock sources 124*b*, 124*c*, 124*d*, 124*d* and 124*e* are sequentially enabled in such a manner, the clock control circuit 122*e* transmits the acknowledgment (ACK), indicating the resumption of the clock provision from the clock source 124*e*, to the clock control circuit 122*f*. Upon receiving the acknowledgment (ACK), the clock control circuit 122*f* enables the clock source 124*f*, provides the clock signal to the IP block 200, and provides the acknowledgment (ACK) to the channel management circuit 130.

In this way, the clock control circuits 122*a*, 122*b*, 122*c*, 122*d*, 122*e*, 122*f* and 122*g* operate in a full handshake manner for transmitting and receiving clock requests (REQs) and acknowledgments (ACKs) between parents and children. As a result, the clock control circuits 122*a*, 122*b*, 122*c*, 122*d*, 122*e*, 122*f* and 122*g* control the clock sources 124*a*, 124*b*, 124*c*, 124*d*, 124*e*, 124*f* and 124*g* with hardware, and consequently, control the clock signal provided to the IP blocks 200 and 210.

The clock control circuits 122*a*, 122*b*, 122*c*, 122*d*, 122*e*, 122*f* and 122*g* may independently operate to transmit the clock request (REQ) to their parents or control the clock sources 124*a*, 124*b*, 124*c*, 124*d*, 124*e*, 124*f* and 124*g*. In addition, the clock control circuits 122*a*, 122*b*, 122*c*, 122*d*, 122*e*, 122*f* and 122*g* may operate under the control of the CMU controller 110. On the other hand, in exemplary embodiments of the present inventive concept, the clock control circuits 122*a*, 122*b*, 122*c*, 122*d*, 122*e*, 122*f* and 122*g* may include a finite state machine (FSM) which controls each of the clock sources 124*a*, 124*b*, 124*c*, 124*d*, 124*e*, 124*f* and 124*g* in response to the clock request (REQ) transmitted and received between the parents and the children.

Figure 2:
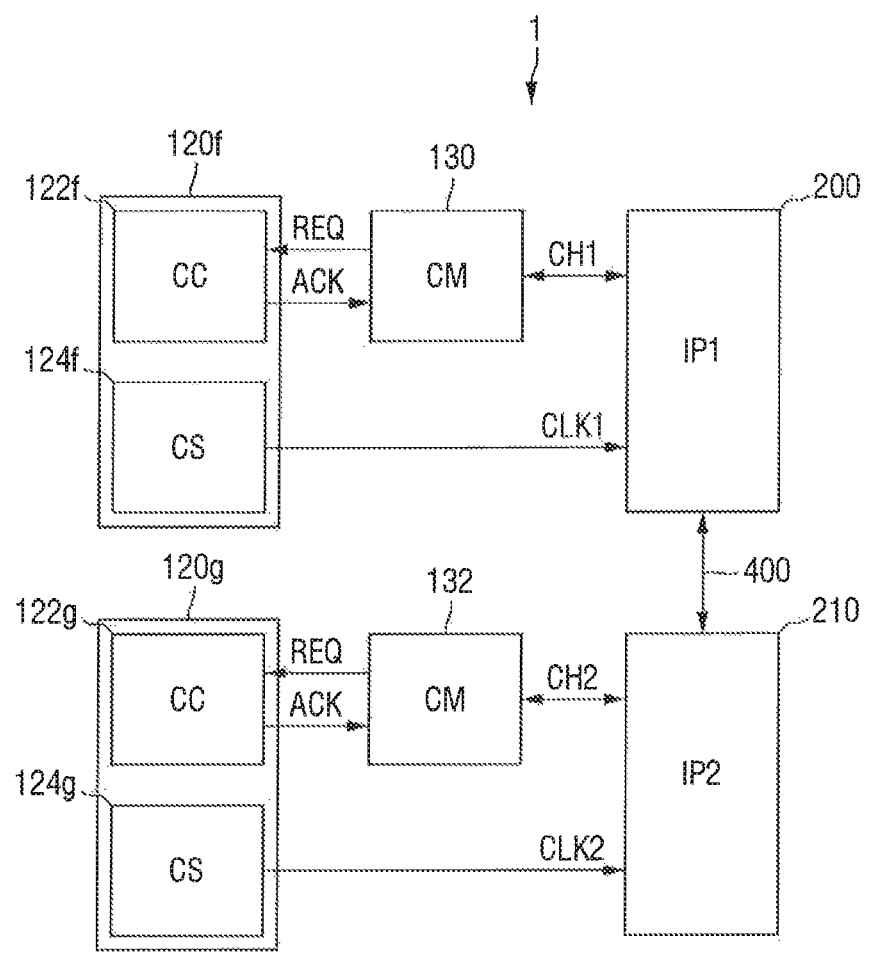
FIGS. 2 and 3 are schematic diagrams of a semiconductor device according to an exemplary embodiment of the present inventive concept.
Figure 3:
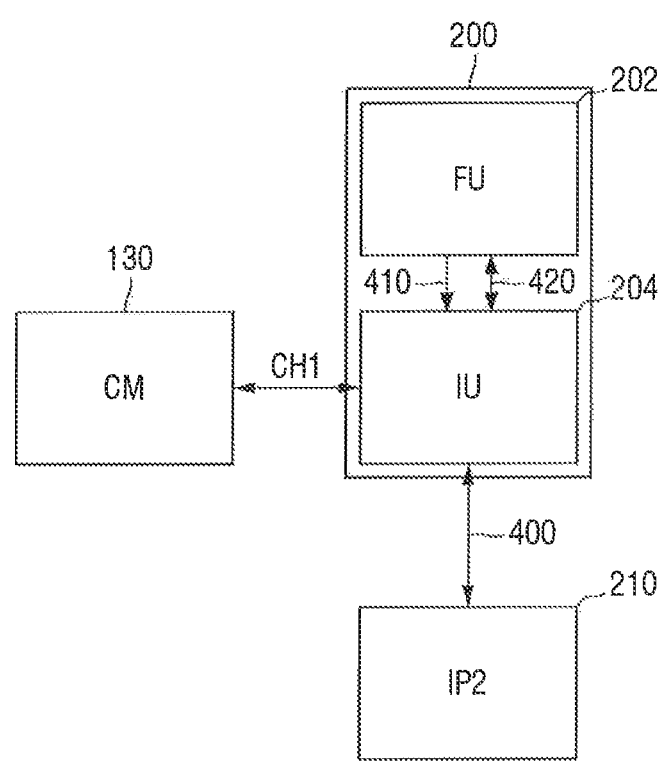

FIGS. 2 and 3 are schematic diagrams of a semiconductor device according to an exemplary embodiment of the present inventive concept.

Referring to FIG. 2, in a semiconductor device 1 according to the present embodiment, the IP block 200 and the IP block 210 have a master-slave relationship. In the present embodiment, the IP block 200 may be a slave device, and the IP block 210 may be a master device. For example, the IP block 210 may include a processor, a controller and the like, and the IP block 200 may include an internal memory device, an external memory interface and the like. The IP block 210 and the IP block 200 may be electrically connected to each other via a bus 400.

Hereinafter, for the sake of convenience, the IP block 210 and the IP block 200 will be expressed by a master IP block 210 and a slave IP block 200, respectively.

In exemplary embodiments of the present inventive concept, the type of the bus 400 through which the master IP block 210 and the slave IP block 200 may transmit and receive data to and from each other is not particularly limited. However, it should be noted that the bus to which exemplary embodiments of the present inventive concept are applicable includes, for example, includes a bus conforming to a protocol which does not consider the operating state of the slave device when the master device and the slave device execute the bus's operation, such as an advanced peripheral bus protocol (APB protocol) and an advanced high-performance bus protocol (AHB protocol). For example, the master IP block 210 may transmit a bus operation signal for data transmission to the slave IP block 200, without considering whether the slave IP block 200 is currently in a sleep state or a run state.

In exemplary embodiments of the present inventive concept, the bus operation signals include an address signal, a data signal, a control signal and the like, which are necessary for the master IP block 210 and the slave IP block 200 to perform the bus operation. Additionally, the bus operation signals may be provided in various forms depending on the type of protocols adopted by the bus 400. Specific examples thereof will be described later with reference to FIGS. 4 and 9.

As described in FIG. 1 above, the master IP block 210 and the slave IP block 200 make a clock request to the CMU 100 in a full handshake manner, and may receive the clock signal from the CMU 100.

For example, the slave IP block 200 transmits a request for clock provision or a request for clock provision stop via a channel CH1 formed between the slave IP block 200 and the channel management circuit 130. The channel management circuit 130 and the clock component 120f transmit and receive the clock request (REQ) and the acknowledgement (ACK), and control the clock signal (CLK1) provided to the slave IP block 200. The clock component 120f includes a clock source 124f for generating the clock signal (CLK1), and a clock control circuit 122f for controlling the clock source 124f in hardware, as illustrated in FIG. 1 above.

As in the case of the slave IP block 200, the master IP block 210 transmits a request for clock provision or a request for clock provision stop via a channel CH2 formed between the master IP block 210 and the channel management circuit 132. The clock component 120g and the channel management circuit 132 transmit and receive the clock request (REQ) and the acknowledgement (ACK), and control the clock signal (CLK2) provided to the master IP block 210. As illustrated in FIG. 1 above, the clock component 120g includes a clock source 124g for generating the clock signal CLK2, and a clock control circuit 122g for controlling the clock source 124g in hardware.

Subsequently, referring to FIG. 3, the slave IP block 200 includes a function unit 202 and an interface unit 204.

The function unit 202 controls the original operation of the slave IP block 200. For example, the function unit 202 corresponds to a circuit region such as the internal memory device and the external memory interface in which the original functions of the slave IP block 200 are provided.

The interface unit 204 transmits and receives signals to and from the function unit 202 via the channels 410 and 420, and provides a signal (e.g., a first signal), which is provided from the master IP block 210, to the function unit 202.

The interface unit 204 may receive an operating state signal from the function unit 202 via the channel 410. The operating state signal received via the channel 410 may include information on the operating state of the function unit 202. For example, the operating state signal may include information on whether the operating state of the function unit 202 is in a sleep state or in a run state.

On the other hand, the interface unit 204 may transmit and receive a second signal to and from the function unit 202 via the channel 420. The second signal transmitted and received via the channel 420 includes a signal corresponding to the first signal provided from the master IP block 210 via the bus 400. For example, the second signal may be a signal transitioned from L to H at a second time point to correspond to a first signal which is transitioned from L to H at a first time point. Here, the second time point may be a time point later than the first time point.

For example, while the slave IP block 200 is in the sleep state, the first signal provided from the master IP block 210 may be transitioned from L to H at the first time point. In this case, after the slave IP block 200 wakes up, the interface unit 204 may include a signal that is transitioned from L to H at a second time point later than the first time point.

As described above with reference to FIG. 2, for example, in the case of the bus 400 conforming to the APB protocol or the AHB protocol, the master IP block 210 may transmit the bus operation signal to the slave IP block 200, without considering the state of the slave IP block 200. At this time, if the slave IP block 200 is in the sleep state, the slave IP block 200 may not receive the bus operation signal of the master IP block 210. To avoid this, the interface unit 204 may, for example, receive the first signal instead of the function unit 202 which is in the sleep state at the first point time when the master IP block 210 provides the first signal (e.g., the bus operation signal). Further, the interface unit 204 may, for example, provide the second signal to the function unit 202 at the second time point when the slave IP block 200 wakes up. In other words, at the second time point, the interface unit 204 may generate the second signal corresponding to the first signal.

After receiving the first signal from the master IP block 210, the interface unit 204 may transmit the clock request to the channel management circuit 130 of the CMU 100 to wake up the function unit 202 of the slave IP block 200.

As a result, the function unit 202 may immediately execute the bus operation with the master IP block 210 in accordance with the second signal received from the interface unit 204 after wake-up.

To provide such an operation, the function unit 202 and the interface unit 204 may be driven by different clock signals. The provision of the different clock signals may be changed, depending on a particular purpose.

Figure 4:
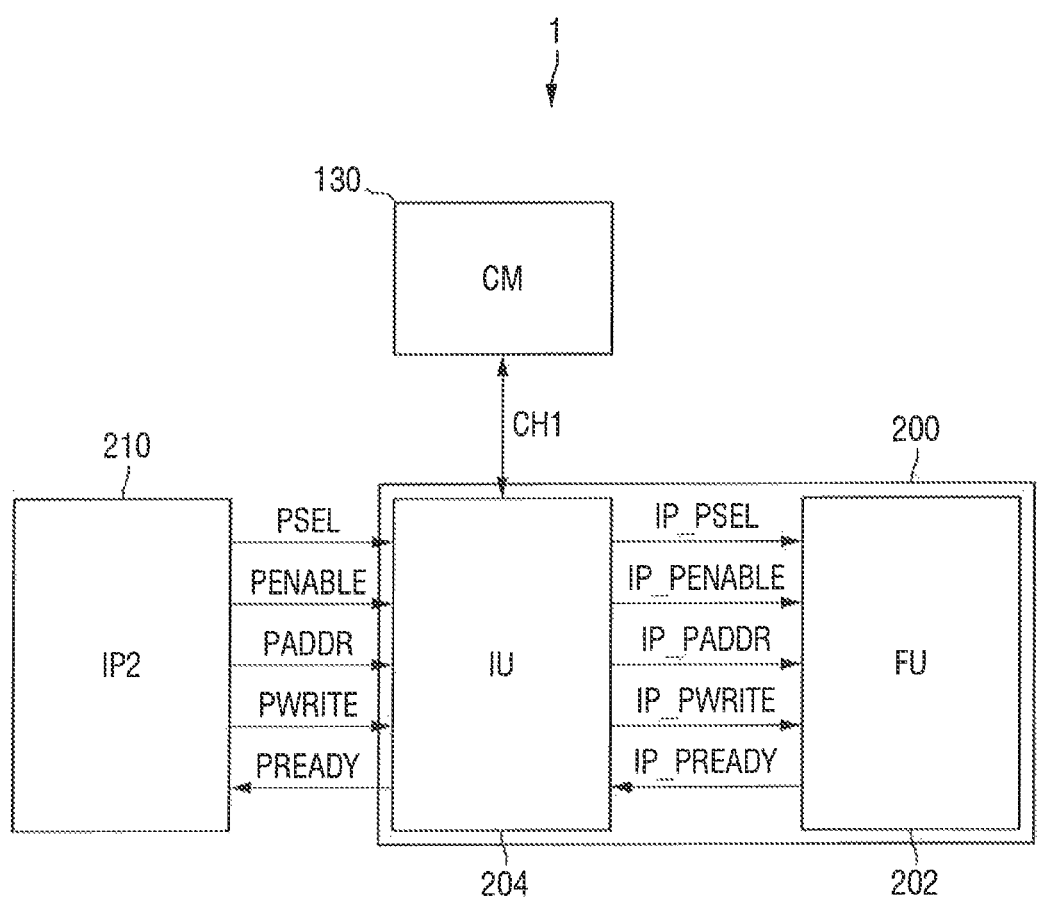
FIG. 4 is a schematic diagram illustrating an operation of a semiconductor device according to an exemplary embodiment of the present inventive concept.

FIG. 4 is a schematic diagram illustrating an operation a semiconductor device according to an exemplary embodiment of the present inventive concept.

Referring to FIG. 4, in the semiconductor device 1 according to the current embodiment, the master IP block 210 and the slave IP block 200 may perform the bus operation via the bus 400 conforming to the APB protocol. In exemplary embodiments of the present inventive concept, the master IP block 210 may include an APB bridge block that mediates data communication with another bus conforming to another protocol, e.g., the AHB protocol. For this discussion, the function unit 202 of the slave IP block 200 is first assumed to be in the sleep state.

The master IP block 210 may transmit the first signal to the slave IP block 200 to perform the bus operation with the slave IP block 200. At this time, the master IP block 210 does not consider the operating state of the function unit 202. In the present embodiment, the first signal transmitted by the master IP block 210 may include signals such as PSEL, PENABLE, PADDR and PWRITE. The definitions and explanations of these signals are provided in the "AMBA™ 3 APB Protocol v1.0 Specification (ARM IHI 0024B)" document distributed by ARM Corporation, the disclosure of which is incorporated by reference herein in its entirety.

The interface unit 204 recognizes that the function unit 202 is currently in the sleep state via the channel 410. The interface unit 204 receives the first signal provided from the master IP block 210 when the function unit 202 is in the sleep state.

Next, to wake up the function unit 202 of the slave IP block 200, the interface unit 204 transmits the clock request to the channel management circuit 130 of the CMU 100 via the channel CH1, and may receive the acknowledgement (ACK) from the channel management circuit 130. The interface unit 204 may check that the clock signal is provided to the slave IP block 200 via the acknowledgement (ACK) received from the channel management circuit 130.

Thereafter, the interface unit 204 detects whether or not the function unit 202 has been transitioned to the running state via the channel 410. When the function unit 202 is transitioned to the running state, the interface unit 204 generates a second signal corresponding to the first signal, and provides the generated second signal to the function unit 202. Here, the second signal refers to signals such as IP_PSEL, IP_PENABLE, IP_PADDR and IP_PWRITE. These signals correspond to signals such as PSEL, PENABLE, PADDR, and PWRITE which are the first signals.

As a result, after the wake-up, the function unit 202 may immediately perform the bus operation conforming to the master IP block 210 and the APB protocol, in accordance with the second signal received from the interface unit 204.

Additionally, the interface unit 204 receives the IP_PREADY signal which is output from the function unit 202 of the slave IP block 200 during the bus operation, and may provide the IP_PREADY signal as a PREADY signal conforming to the APB protocol to the master IP block 210.

Figure 5:
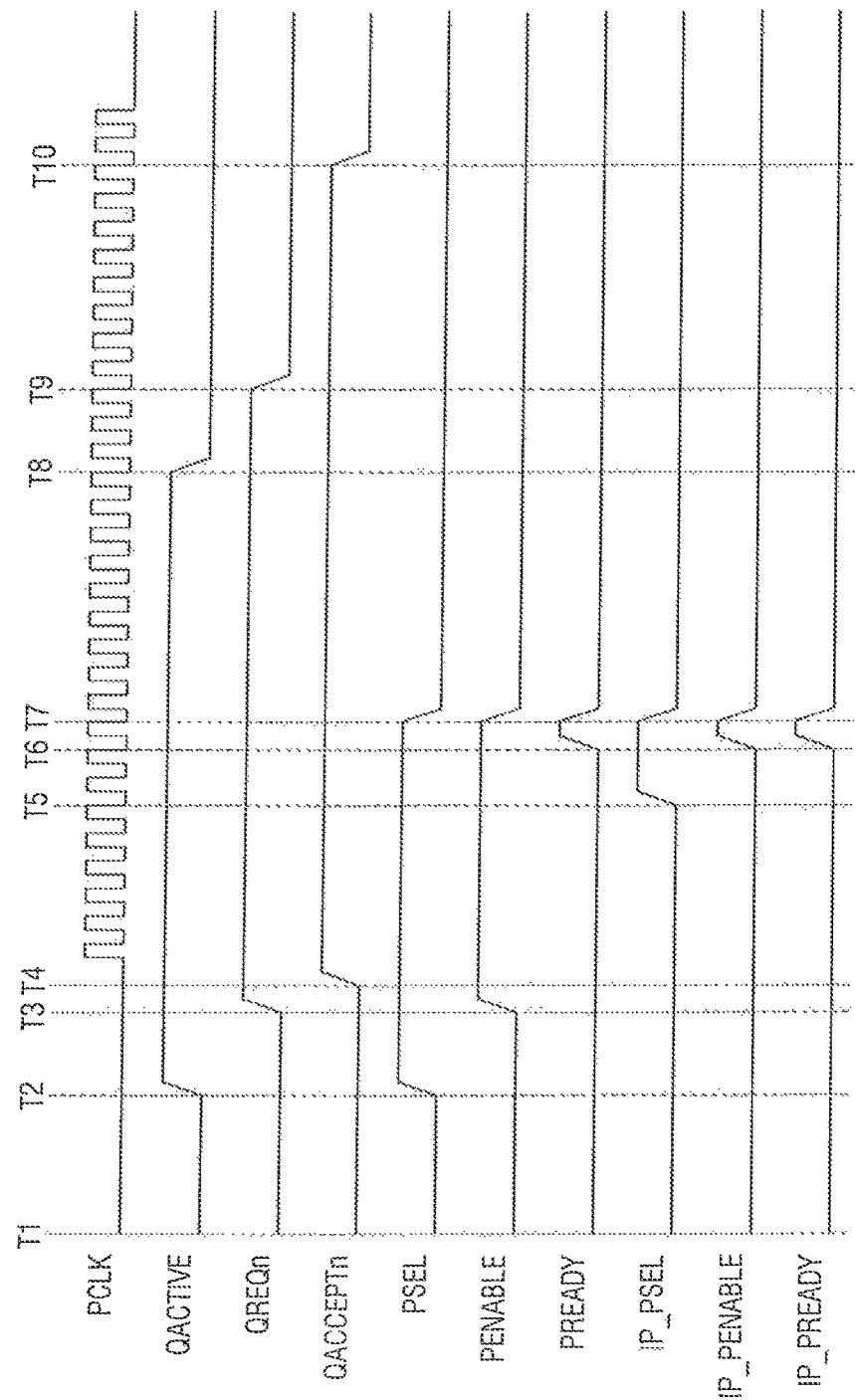
FIG. 5 is a timing chart illustrating an operation of the semiconductor device of FIG. 4, according to an exemplary embodiment of the present inventive concept.

FIG. 5 is a timing chart illustrating an operation of the semiconductor device of FIG. 4 according to an exemplary embodiment of the present inventive concept.

Referring to FIG. 5, the function unit 202 of the slave IP block 200 is in the sleep state at T1.

At T2, the master IP block 210 (e.g., the APB bridge block) starts the bus operation, while transmitting the PSEL signal to the slave IP block 200, and thereafter, the master IP block 210 transmits a PENABLE signal to the slave IP block 200 at T3.

The PSEL signal and the PENABLE signal may be provided from the master IP block 210 at a constant clock interval (e.g., one clock interval or two clock intervals), and its specific provision contents may be determined depending on a specific provision purpose.

At T2, upon receiving the PSEL signal of the master IP block 210, the interface unit 204 transmits the clock request to the channel management circuit 130 of the CMU 100 via the channel CH1 to wake up the function unit 202 of the slave IP block 200. For example, when the channel CH1 conforms to the Q-channel interface, the interface unit 204 may transmit and receive signals such as QACTIVE, QREQn, QACCEPTn or the like to and from the channel management circuit 130. The definitions and explanations of these signals may be found in the "Low Power Interface Specification: ARM Q-Channel and P-Channel Interfaces (ARM IHI 0068B)" document distributed by ARM Corporation, the disclosure of which is incorporated by reference herein in its entirety.

The clock PCLK is provided to the function unit 202 of the slave IP block 200 around or after T4, and the slave IP block 200 performs the wake-up procedure. At this time, the master IP block 210 equally maintains the PSEL and PENABLE signals, until the PREADY signal is provided from the slave IP block 200.

At T5 or after, the interface unit 204 that recognizes the wake-up of the function unit 202 and generates IP_PSEL and IP_PENABLE signals corresponding to the PSEL and PENABLE signals. The IP_PSEL signal and the IP_PENABLE signal may have the same clock intervals (T5 to T6) as the clock intervals (T2 to T3) between the PSEL signal and the PENABLE signal. The interface unit 204 also provides the generated IP_PSEL and IP_PENABLE signal to the function unit 202.

At T6 of after, upon receiving the IP_PSEL and IP_PENABLE signals from the interface unit 204, the function unit 202 may transmit the PREADY signal to the master IP block 210 via the interface unit 204. For example, the function unit 202 transmits the IP_PREADY signal to the interface unit 204, and the interface unit 204 transmits the IP_PREADY signal as a PREADY signal to the master IP block 210.

Thereafter, when the bus operation is completed, to transition the function unit 202 of the slave IP block 200 into the sleep state, the interface unit 204 may transmit a request for clock provision stop to the channel management circuit 130 of the CMU 100 through the channel CH1. As it can be seen from T8 to T10 if, for example, the channel CH1 conforms to the Q-channel interface, the interface unit 204 may transmit and receive the signals such as QACTIVE, QREQn and QACCEPTn to and from the channel management circuit 130.

Figure 6:
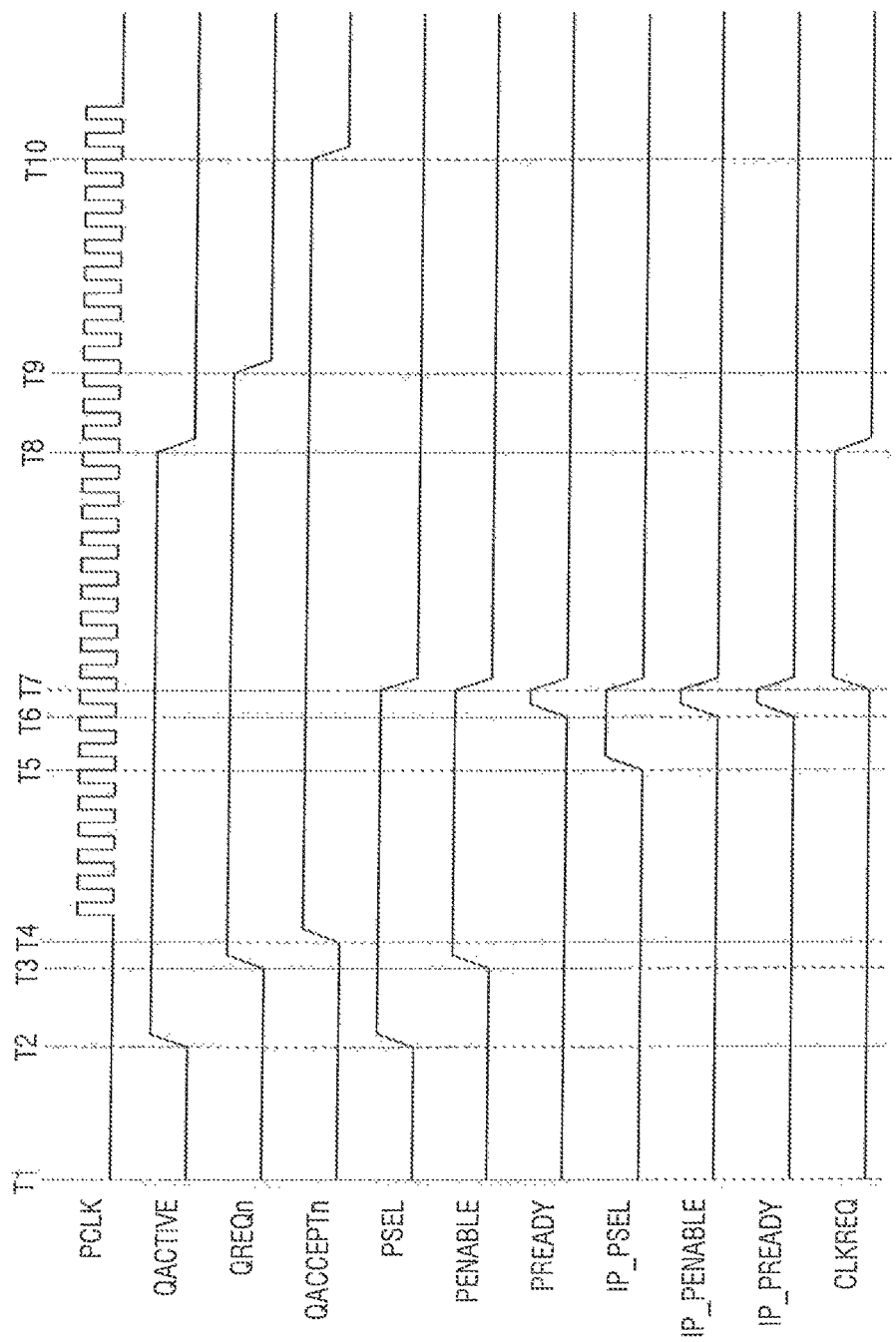
FIG. 6 is a timing chart illustrating an operation the semiconductor device of FIG. 4, according to an exemplary embodiment of the present inventive concept.

FIG. 6 is a timing chart illustrating an operation of the semiconductor device of FIG. 4 according to an exemplary embodiment of the present inventive concept.

FIG. 5 illustrates a scenario in which the function unit 202 of the slave IP block 200 is transitioned into the sleep state with completion of the bus operation, whereas FIG. 6 illustrates a scenario in which the interface unit 204 further transmits a clock request (CLKREQ) to the channel management circuit 130 of the CMU 100 after the bus operation is completed.

For example, at T6, in response to receiving the IP_PSEL and IP_PENABLE signals from the interface unit 204, the function unit 202 may transmit the PREADY signal to the master IP block 210 via the interface unit 204. For example, the function unit 202 may transmit the IP_PREADY signal to the interface unit 204, and the interface unit 204 may transmit the IP_PREADY signal as a PREADY signal to the master IP block 210.

Thereafter, when the bus operation is completed but one also needs to operate the slave IP block 200, the interface unit 204 may autonomously transmit the clock request (CLKREQ) to the channel management circuit 130 of the CMU 100.

Thereafter, when the additional operation is completed, to transition the function unit 202 of the slave IP block 200 into the sleep, the interface unit 204 may transmit a request for clock provision stop to the channel management circuit 130 of the CMU 100 through the channel CH1. As it can be seen from T8 to T10, for example, if the channel CH1 conforms to the Q-channel interface, the interface unit 204 may transmit and receive the signals such as QACTIVE, QREQn and QACCEPTn to and from the channel management circuit 130.

Figure 7:
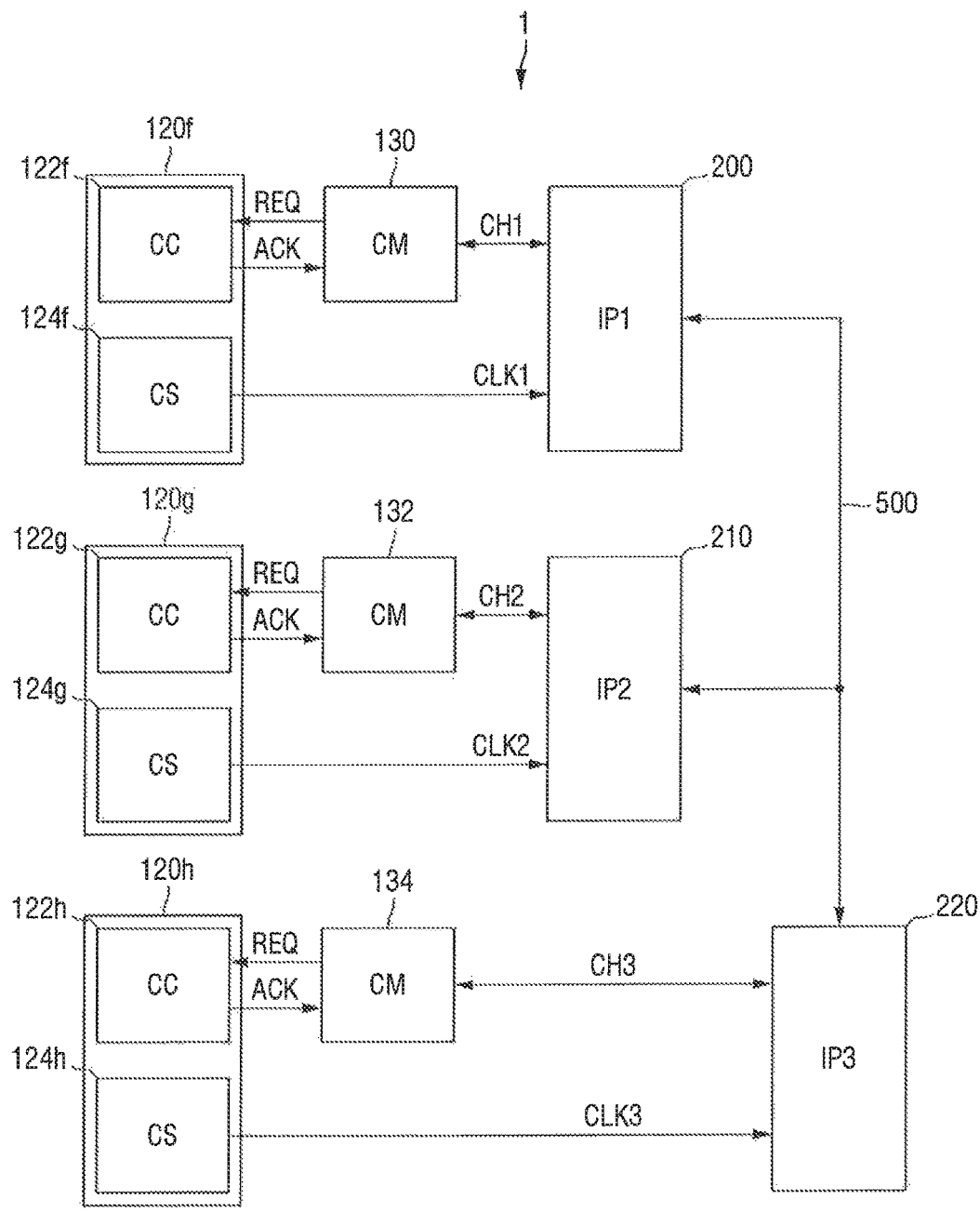
FIGS. 7 and 8 are schematic diagrams of a semiconductor device according to an exemplary embodiment of the present inventive concept.
Figure 8:
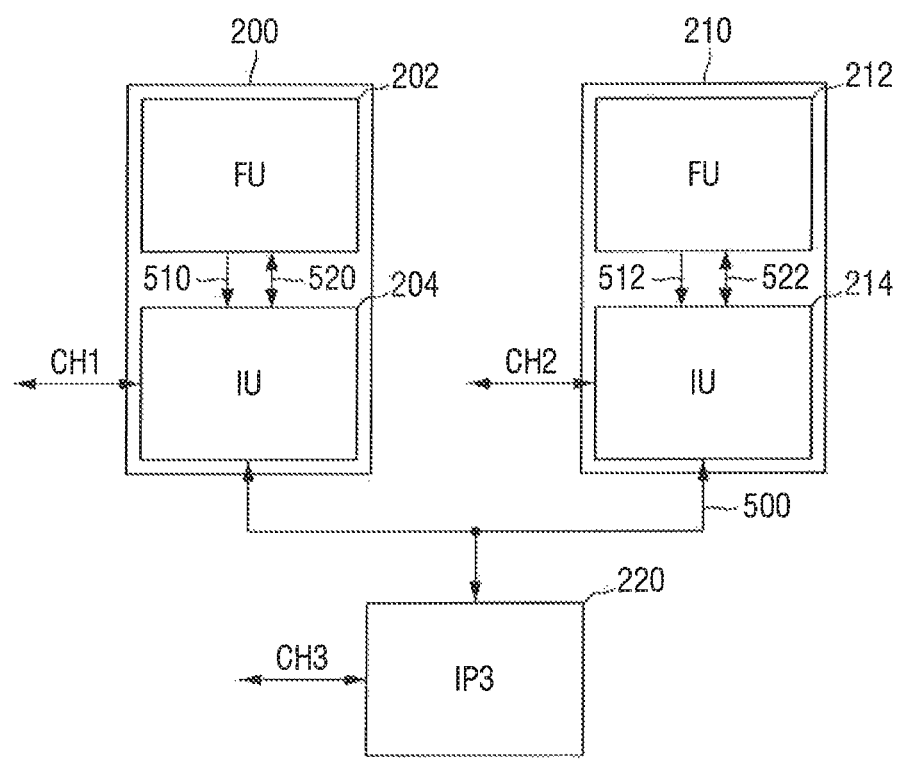

FIGS. 7 and 8 are schematic diagrams of a semiconductor device according to an exemplary embodiment of the present inventive concept.

Referring to FIG. 7, in the semiconductor device 1 according to the current embodiment, the IP blocks 200 and 210 and an IP block 220 have a master-slave relationship. In the present embodiment, the IP blocks 200 and 210 may be a slave device, and the IP block 220 may be a master device. The IP blocks 220 and the IP blocks 200 and 210 may be electrically connected to one another via the bus 500.

Hereinafter, for convenience, the IP block 220 and the IP blocks 200 and 210 will be expressed by the master IP block 220 and the slave IP blocks 200 and 210, respectively.

As described above with reference to FIG. 2, the type of the bus 500 is not particularly limited, and the bus 500 also includes a bus conforming to a protocol which does not consider the operating state of the slave device, when the master device performs a bus operation with the slave device, for example, a bus operation in the AHB protocol.

Like that described in reference to FIG. 1, the master IP block 220 and the slave IP blocks 200 and 210 make a clock request to the CMU 100 in a full-handshake manner, and receive the clock signal from the CMU 100.

For example, the slave IP blocks 200 and 210 transmit the request for clock provision or the request for clock provision stop via the channels CH1 and CH2 formed between the channel management circuits 130 and 132, respectively. The channel management circuits 130 and 132 and the clock components 120f and 120g transmit and receive the clock request (REQ) and the acknowledgement (ACK), respectively, and control each of the clock signals (CLK1 and CLK2) to be provided to the slave IP blocks 200 and 210, respectively. As described above with reference to FIG. 1, the clock components 120f and 120g include the clock sources 124f and 124g for generating each of the clock signals CLK1 and CLK2, and the clock control circuits 122f and 122g for controlling the clock sources 124f and 124g in hardware, respectively.

As in the case of the slave IP blocks 200 and 210, the master IP block 220 transmits the request for clock provision or the request for clock provision stop via a channel CH3 formed between the master IP block 220 and a channel management circuit 134. The channel management circuit 134 and the clock component 120h transmit and receive the clock request (REQ) and the acknowledgement (ACK), and control a clock signal (CLK3) to be provided to the master IP block 220. As described with reference to FIG. 1, the clock component 120h includes a clock source 124h for generating the clock signal (CLK3), and a clock control circuit 122h for controlling the clock source 124h in terms of hardware.

Subsequently, referring to FIG. 8, the slave IP blocks 200 and 210 include function units 202 and 212 and interface units 204 and 214, respectively.

The function units 202 and 212 control the original operation of the slave IP blocks 200 and 210, and the interface units 204 and 214 transmit and receive signals to and from the function units 202 and 212 through channels 510, 520, 512 and 522, and provide a first signal, which is provided from the master IP block 220, to the function units 202 and 212.

The interface units 204 and 214 may receive operating state signals from the function units 202 and 212 via the channels 510 and 512, respectively. On the other hand, the interface units 204 and 214 may transmit and receive a second signal to and from the function unit 202 via the channels 520 and 522, respectively. Since the descriptions of the first signal and the second signal overlap with the description provided with reference to FIG. 3, their descriptions will be omitted here.

The interface units 204 and 214 receive the first signal on behalf of the function units 202 and 212 that are in the sleep state at a first time point when the master IP block 220 provides the first signal. The interface units 204 and 214 may provide the second signal to the function units 202 and 212 at a second time point when the slave IP blocks 200 and 210 wake up. In other words, at the second time point, the interface units 204 and 214 may generate the second signal corresponding to the first signal.

Further, after receiving the first signal from the master IP block 220, to wake up the function units 202 and 212 of the slave IP blocks 200 and 210, the interface units 204 and 214 may transmit a clock request to the channel management circuits 130 and 132 of the CMU 100.

As a result, the function units 202 and 204 may immediately perform a bus operation with the master IP block 220, in accordance with the second signal received from the interface units 204 and 214 after the wake-up.

Figure 9:
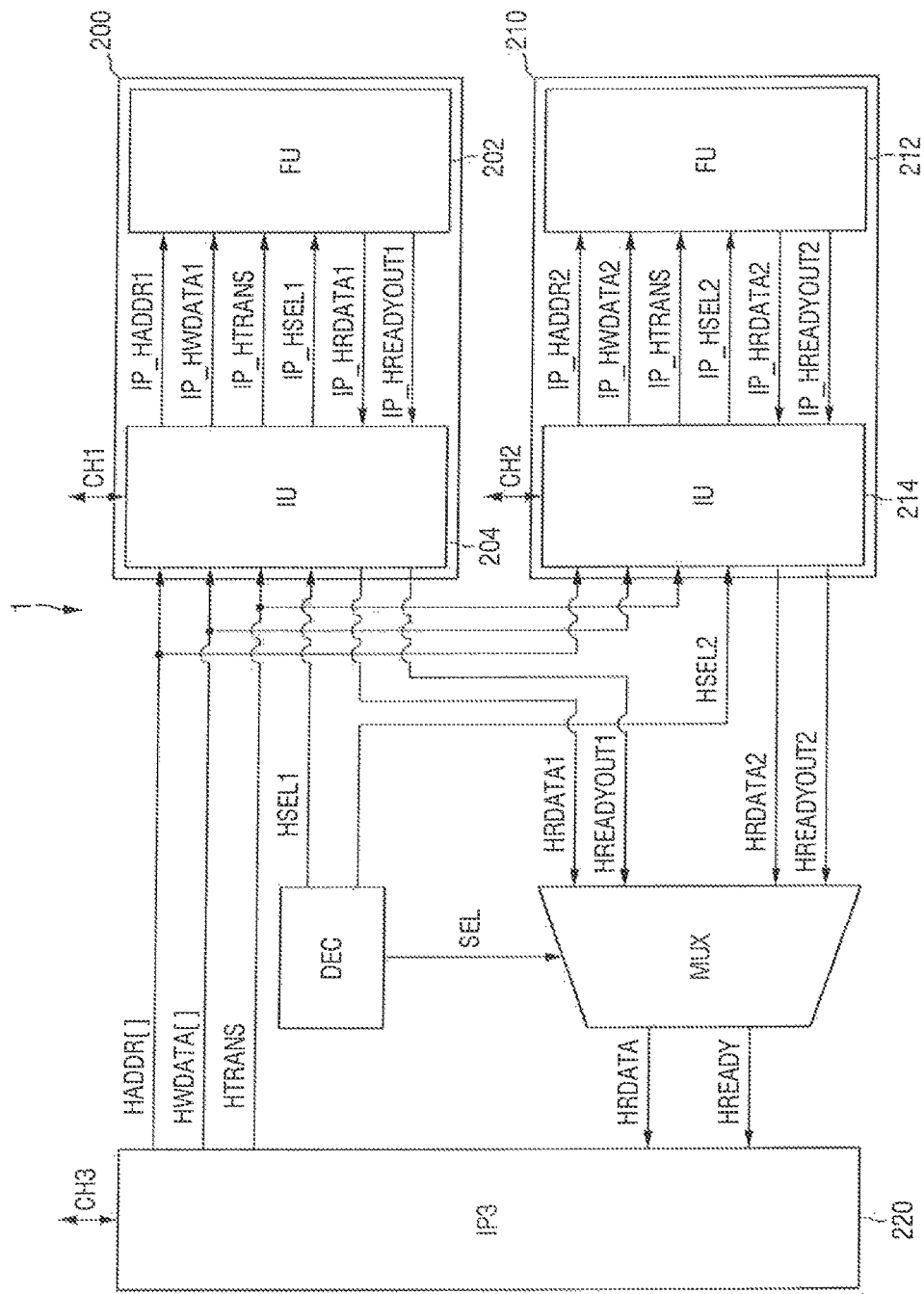
FIG. 9 is a schematic diagram illustrating an operation of a semiconductor device according to an exemplary embodiment of the present inventive concept.

FIG. 9 is a schematic diagram illustrating an operation of a semiconductor device according to an exemplary embodiment of the present inventive concept.

Referring to FIG. 9, in the semiconductor device 1 according to the current embodiment, the master IP block 220 and the slave IP block 200 may perform the bus operation via the bus 400 conforming to the AHB protocol. Here, the function unit 202 of the slave IP block 200 is first assumed to be in the sleep state.

The master IP block 220 may transmit the first signal to the slave IP block 200 to perform a bus operation with the slave IP block 200. At this time, the master IP block 220 does not consider the operating state of the function unit 202. In the present embodiment, the first signal transmitted by the master IP block 220 may include signals such as HADDR, HWDATA and HTRANS. Further, a decoder DEC may receive the input of the HADDR signal and provide an HSEL1 signal to the slave IP block 200. The decoder DEC may also provide a SEL signal to a multiplexing circuit MUX. For the sake of convenience, the HSEL1 signal will also be expressed by the first signal. The definitions and explanations of these signals may be found in the "AMBA™ 3 AHB-Lite Protocol v1.0 Specification (ARM IHI 0033A)" document distributed by ARM Corporation, the disclosure of which is incorporated by reference herein in its entirety.

The interface unit 204 recognizes that the function unit 202 is currently in the sleep state via the channel 510. The interface unit 204 receives the first signal which is provided from the master IP block 220 when the function unit 202 is in the sleep state.

Next, to wake up the function unit 202 of the slave IP block 200, the interface unit 204 transmits the clock request to the channel management circuit 130 of the CMU 100 via the channel CH1, and may receive the acknowledgement (ACK) from the channel management circuit 130. The interface unit 204 may check that the clock signal is provided to the slave IP block 200 through the acknowledgement (ACK) received from the channel management circuit 130.

Thereafter, the interface unit 204 detects whether the function unit 202 is transitioned to the running state via the channel 410. If the function unit 202 is transitioned to the running state, the interface unit 204 generates a second signal corresponding to the first signal, and provides the generated second signal to the function unit 202. Here, the second signal refers to signals such as IP_HADDR, IP_HWDATA, IP_HTRANS and IP_HSEL1. These signals correspond to signals such as HADDR, HWDATA, HTRANS, and HSEL1 which are the first signals, respectively.

As a result, after the wake-up, the function unit 202 immediately performs the bus operation conforming to the master IP block 220 and the AHB protocol, in response to the second signal received from the interface unit 204.

On the other hand, during the bus operation, the interface unit 204 receives the IP_HRDATA1 and IP_HREADYOUT1 signals which are output from the function unit 202 of the slave IP block 200, and may provide the IP_HRDATA1 and IP_HREADYOUT1 signals as HRDATA1 and HREADYOUT1 signals conforming to the APB protocol to the master IP block 210 via the multiplexing circuit (MUX) as HRDATA and HREADY signals.

The above disclosure may be similarly applied for interaction between the master IP block 220 and the slave IP block 210.

Figure 10:
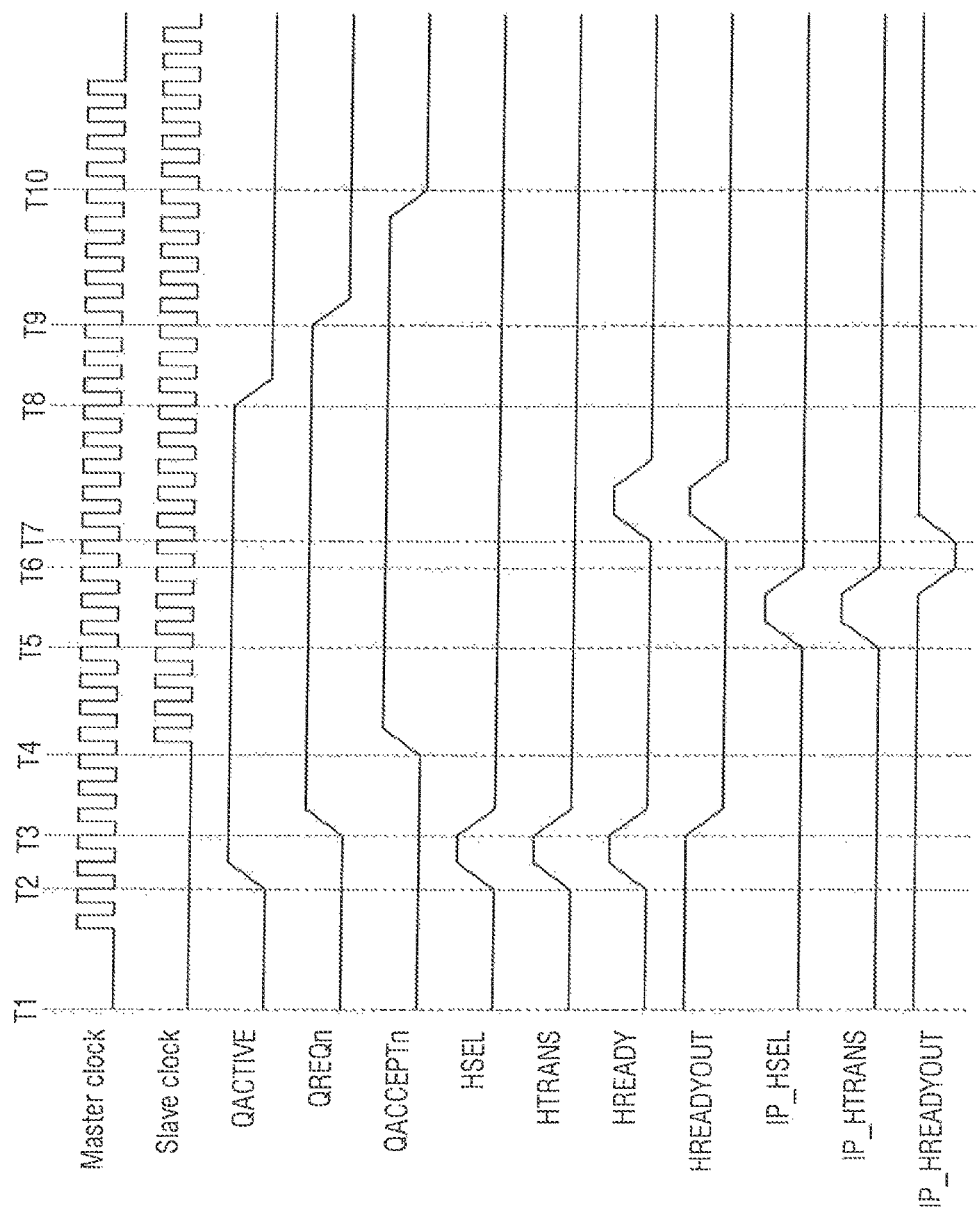
FIG. 10 is a timing chart illustrating an operation of the semiconductor device of FIG. 9, according to an exemplary embodiment of the present inventive concept.

FIG. 10 is a timing chart illustrating an operation of the semiconductor device of FIG. 9 according to an exemplary embodiment of the present inventive concept.

Referring to FIG. 10, the function unit 202 of the slave IP block 200 is in the sleep state at T1.

At T2, the decoder DEC and the master IP block 220 start the bus operation, while transmitting the HSEL and HTRANS signals to the slave IP block 200.

At or after T2, in response to receiving the HSEL and HTRANS signals of the decoder DEC and the master IP block 220, the interface unit 204 transmits the clock request to the channel management circuit 130 of the CMU 100 through the channel CH1 to wake up the function unit 202 of the slave IP block 200. For example, when the channel CH1 conforms to the Q-channel interface, the interface unit 204 may transmit and receive signals such as QACTIVE, QREQn and QACCEPTn to and from the channel management circuit 130.

The master IP block 220 stores the HSEL and HTRANS signals between T2 and T3. After a clock (e.g., a Slave clock) is provided to the function unit 202 of the slave IP block 200 through T4, the stored HSEL and HTRANS signals are regenerated as IP_HSEL and IP_HTRANS signals at T5. When the clock (e.g., the Slave clock) is provided to the function unit 202 of the slave IP block 200, the slave IP block 200 performs a wakeup procedure.

At T5, upon recognizing that the function unit 202 wakes up, the interface unit 204 generates the IP_HSEL and IP_HTRANS signals corresponding to the HSEL and HTRANS signals. The interface unit 204 also provides the generated IP_HSEL and IP_HTRANS signals to the function unit 202.

At T6 of after, upon receiving the IP_HSEL and IP_HTRANS signals from the interface unit 204, the function unit 202 may transmit the HREADYOUT signal to the multiplexing circuit (MUX) via the interface unit 204, and the multiplexing circuit (MUX) may transmit the HREADY signal to the master IP block 220. For example, the function unit 202 transmits the IP_HREADYOUT signal corresponding to the HREADYOUT signal to the interface unit 204, and the interface unit 204 may transmit the IP_HREADYOUT signal as a HREADYOUT signal to the multiplexing circuit (MUX).

Thereafter, when the bus operation is completed, to transition the function unit 202 of the slave IP block 200 into the sleep state, the interface unit 204 may transmit a request for clock provision stop to the channel management circuit 130 of the CMU 100 through the channel CH1. As it can be seen from T8 to T10, for example, if the channel CH1 conforms to the Q-channel interface, the interface unit 204 may transmit and receive the signals such as QACTIVE, QREQn and QACCEPTn to and from the channel management circuit 130.

Figure 11:
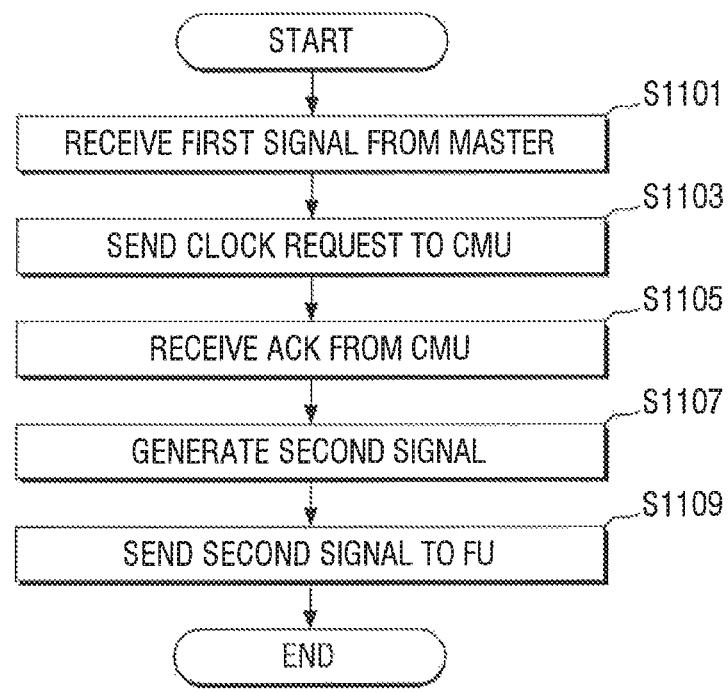
FIG. 11 is a flowchart of a method for operating a semiconductor device according to an exemplary embodiment of the present inventive concept.

FIG. 11 is a flowchart of a method for operating a semiconductor device according to an exemplary embodiment of the present inventive concept.

Referring to FIGS. 3 and 11, a method for operating a semiconductor device according to the present embodiment includes the following steps.

The interface unit 204 receives the first signal from the master IP block 220 (S1101) and transmits a clock request for waking up the function unit 202 of the slave IP block 200 to the CMU 100 (S1103).

After the slave IP block 200 receives the clock signal from the CMU 100, in other words, after the interface unit 204 receives the acknowledgement (ACK) in response to the clock request from the CMU 100 (S1105), the interface unit 204 generates a second signal corresponding to the first signal (S1107).

Thereafter, the interface unit 204 provides the generated second signal to the function unit 202 (S1109), such that the function unit 202 may immediately perform the bus operation with the master IP block 220, in accordance with the second signal received from the interface unit 204 after the wake-up of the function unit 202 which was in the sleep state.

Figure 12:
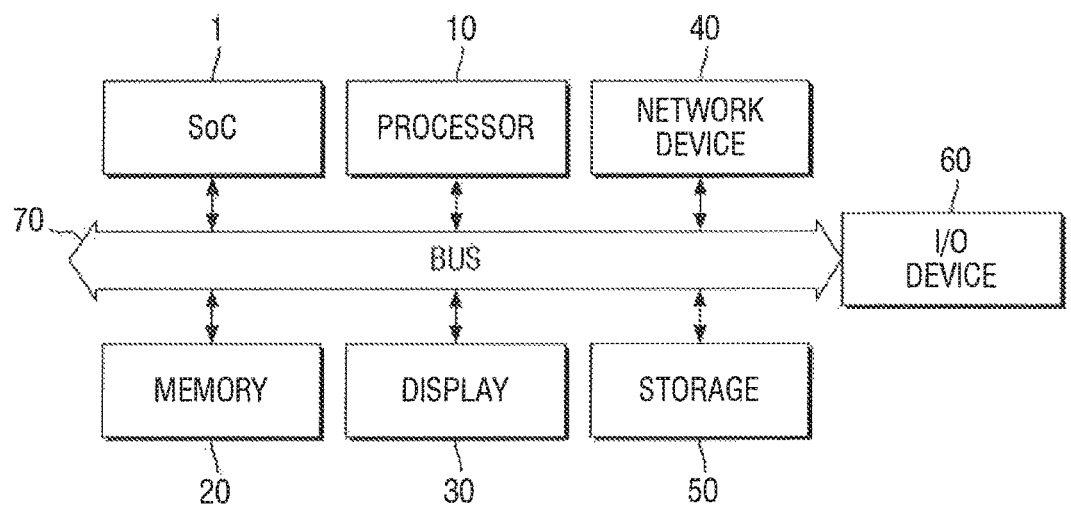
FIG. 12 is a block diagram of a semiconductor system to which a semiconductor device and a method for operating the semiconductor device according to exemplary embodiments of the present inventive concept are applicable.

FIG. 12 is a block diagram of a semiconductor system to which the semiconductor device and the method for operating the semiconductor device according to exemplary embodiments of the present inventive concept are applicable.

Referring to FIG. 12, the semiconductor system, to which the semiconductor device and the method for operating the semiconductor device according to exemplary embodiments of the present inventive concept are applicable, includes a semiconductor device (SoC) 1, a processor 10, a memory device 20, a display device 30, a network device 40, a storage device 50 and an input/output device 60. The semiconductor device (SoC) 1, the processor 10, the memory device 20, the display device 30, the network device 40, the storage device 50 and the input/output device 60 may transmit and receive data with one another via a bus 70.

The IP blocks inside the semiconductor device (SoC) 1 described in exemplary embodiments of the present inventive concept include at least one of a memory controller which controls the memory device 20, a display controller which controls the display device 30, a network controller which controls the network device 40, a storage controller which controls the storage device 50, and an input/output controller which controls the input/output device 60. Further, the semiconductor system may further include an additional processor which controls these devices.

Figure 13:
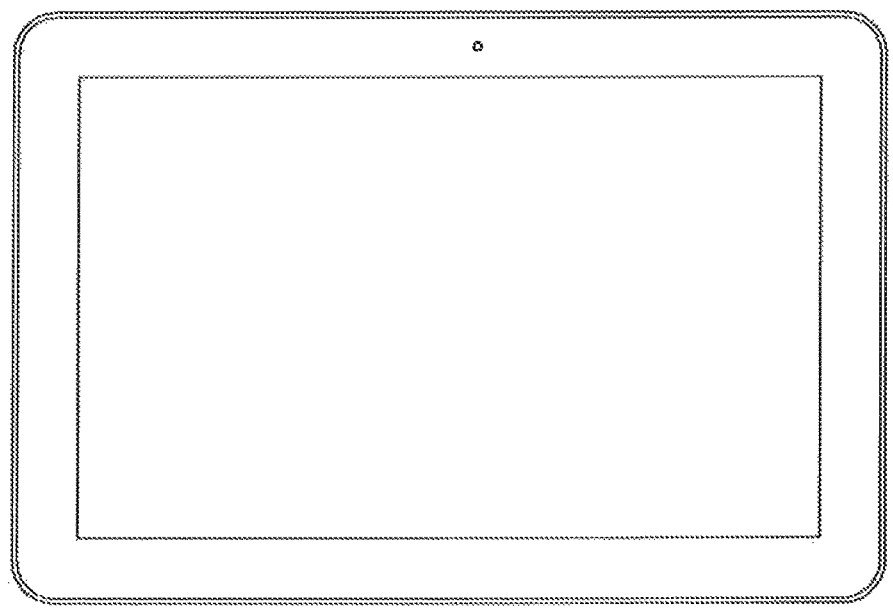
FIGS. 13, 14 and 15 are semiconductor systems to which the semiconductor device and the method for operating the semiconductor device according to exemplary embodiments of the present inventive concept are applicable.
Figure 14:
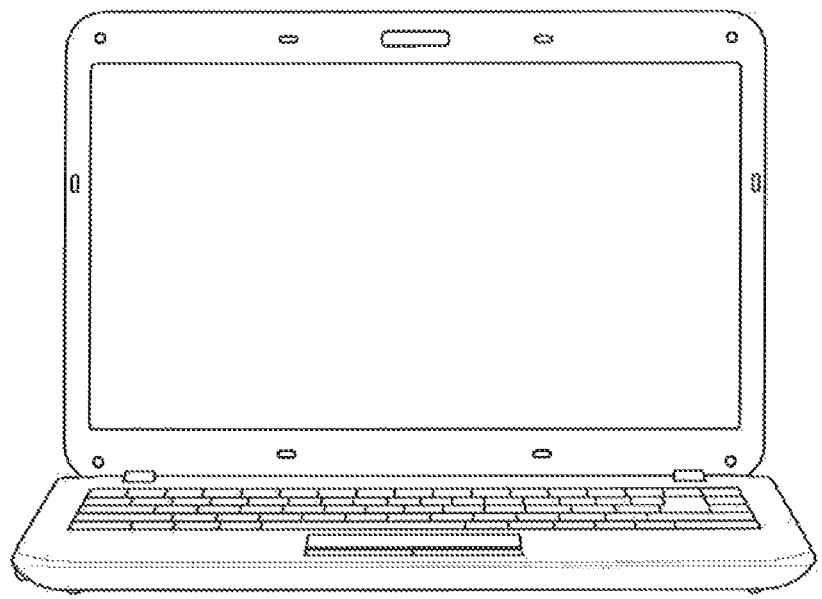
Figure 15:
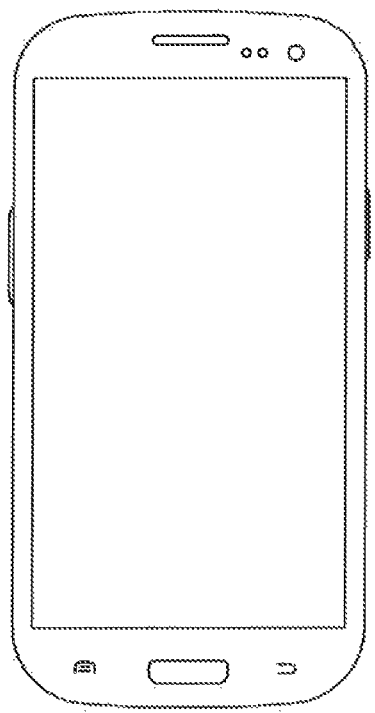

FIGS. 13 to 15 are semiconductor systems to which the semiconductor device and the method for operating the semiconductor device according to exemplary embodiments of the present inventive concept are applicable.

FIG. 13 is a diagram illustrating a tablet PC 1200, FIG. 14 is a diagram illustrating a laptop computer 1300, and FIG. 15 illustrates a smartphone 1400. The semiconductor device according to exemplary embodiments of the present inventive concept may be used for the tablet PC 1200, the laptop computer 1300, the smartphone 1400, and the like.

It is to be understood that the semiconductor device according to exemplary embodiments of the present inventive concept is also applicable to other integrated circuit devices that are not illustrated.

For example, although only the tablet PC 1200, the laptop computer 1300, and the smartphone 1400 have been described above as application examples of the inventive semiconductor system, the inventive semiconductor system is not limited thereto.

In exemplary embodiments of the present inventive concept, the semiconductor system may be a computer, a ultra mobile personal computer (UMPC), a workstation, a netbook, a personal digital assistant (PDA), a portable computer, a wireless phone, a mobile phone, an e-book, a portable multimedia player (PMP), a portable game machine, a navigation device, a black box, a digital camera, a three-dimensional television set, a digital audio recorder, a digital audio player, a digital picture recorder, a digital picture player, a digital video recorder, a digital video player or the like.

An exemplary of the present inventive concept provides a semiconductor device for executing a bus operation in a master-slave relationship of a system in which a clock signal is controlled by hardware.

An exemplary embodiment of the present inventive concept provides a semiconductor system for executing a bus operation in a master-slave relationship of a system in which a clock signal is controlled by hardware.

An exemplary embodiment of the present inventive concept provides a method for operating a semiconductor device for executing a bus operation in a master-slave relationship of a system in which a clock signal is controlled by hardware.

While the present inventive concept has been particularly illustrated and described with reference to exemplary embodiments thereof, it will be understood by those of ordinary skill in the art that various changes in form and detail may be made therein without departing from the spirit and scope of the present inventive concept as defined by the following claims.

What is claimed is:

1. A semiconductor device, comprising:
a first intellectual property block (IP block) which comprises a function unit and an interface unit;
a first clock control circuit which controls a first clock source;
a second clock control circuit which transmits a first clock request to the first clock control circuit, controls a second clock source which receives a clock signal from the first clock source, and provides the clock signal directly to the first IP block; and
a channel management circuit configured to transmit a second clock request to the second clock control circuit in response to a clock stop request received from the first IP block,
wherein, in response to the clock stop request from the first IP block, the second clock control circuit disables the second clock source and transmits a request for clock provision stop as the first clock source to the first clock control circuit,
wherein the function unit controls an operation of the first IP block, and the interface unit receives a first signal provided from a second IP block electrically connected to the first IP block and provides the first signal to the function unit.

2. The semiconductor device of claim 1, wherein the interface unit receives information on an operating state of the function unit of the first IP block, and the operating state comprises a sleep state or a running state.

3. The semiconductor device of claim 1, wherein the interface unit receives the first signal which is provided from the second IP block, while the function unit of the first IP block is in a sleep state.

4. The semiconductor device of claim 3, wherein the interface unit transmits the clock stop request to the channel management circuit after receiving the first signal.

5. The semiconductor device of claim 3, wherein the interface unit generates a second signal corresponding to the first signal, after the function unit of the first IP block wakes up.

6. The semiconductor device of claim 5, wherein the interface unit provides the second signal to the function unit, after the function unit of the first IP block wakes up.

7. The semiconductor device of claim 1, wherein the first IP block is a slave device, and the second IP block is a master device.

8. The semiconductor device of claim 1, wherein the first signal comprises a bus operation signal.

9. The semiconductor device of claim 8, wherein the bus operation signal comprises an address signal, a data signal, or a control signal.

10. The semiconductor device of claim 8, wherein the function unit of the first IP block performs a bus operation with the second IP block, after receiving the first signal from the interface unit.

11. A semiconductor device, comprising:
a master intellectual property (IP) block which operates in response to a first clock signal provided from a clock management unit (CMU); and
a slave IP block which comprises a function unit which operates in response to a second clock signal provided from the CMU, and an interface unit configured to receive a bus operation signal from the master IP block at a first time point and provide the bus operation signal to the function unit at a second time point different from the first time point,
wherein the CMU includes a first clock source for providing the first clock signal, the first clock source being controlled by a first clock control circuit, a second clock source for providing the second clock signal, and a third clock source for providing a third clock signal to the first and second clock sources, wherein the first and second clock signals are based on the third clock signal, and
wherein, in response to a clock stop request from the slave IP block, a second clock control circuit disables the second clock source and transmits a request for clock provision stop to a third clock control circuit that controls the third clock source.

12. The semiconductor device of claim 11, wherein the interface unit receives information on an operating state of the function unit, and the operating state comprises a sleep state or a running state.

13. The semiconductor device of claim 11, wherein the interface unit receives the bus operation signal from the master IP block when the function unit is in the sleep state.

14. The semiconductor device of claim 13, wherein the interface unit transmits a clock request to the CMU, after receiving the bus operation signal from the master IP block.

15. The semiconductor device of claim 13, wherein the interface unit provides the bus operation signal to the function unit, at the second time point when the function unit wakes up.

16. The semiconductor device of claim 15, wherein the function unit performs the bus operation with the master IP block, after receiving the bus operation signal from the interface unit.

17. The semiconductor device of claim 11, wherein the bus operation signal comprises an address signal, a data signal, or a control signal.

18. The semiconductor device of claim 11, wherein the master IP block and the slave IP block transmit and receive data, in accordance with an advanced peripheral bus protocol (APB protocol) or an advanced high-performance bus protocol (AHB protocol).

19. The semiconductor device of claim 18, wherein the master IP block comprises an APB bridge block.

20. A semiconductor system, comprising:
a system-on-chip (SoC) comprising:
- a first intellectual property block (IP block) which comprises a function unit and an interface unit;
- a second IP block electrically connected to the first IP block;
- a first clock control circuit which controls a first clock source;
- a second clock control circuit which transmits a first clock request to the first clock control circuit, controls a second clock source which receives a clock signal from the first clock source, and provides the clock signal directly to the first IP block; and
- a channel management circuit which transmits a second clock request to the second clock control circuit in response to a clock stop request received from the first IP block, and
- one or more external devices electrically connected to the SoC,
- wherein, in response to the clock stop request from the first IP block, the second clock control circuit disables the second clock source and transmits a request for clock provision stop as the first clock source to the first clock control circuit,
- wherein the function unit controls an operation of the first IP block, and the interface unit receives a first signal provided from the second IP block and provides the first signal to the function unit.

* * * * *